(12) United States Patent
Ding et al.

(10) Patent No.: US 8,174,294 B1
(45) Date of Patent: May 8, 2012

(54) CONFIGURABLE BUFFER CIRCUITS AND METHODS

(75) Inventors: Weiqi Ding, Fremont, CA (US); Yanjing Ke, Union City, CA (US); Sergey Shumarayev, Los Altos Hills, CA (US)

(73) Assignee: Altera Corporation, San Jose, CA (US)

( * ) Notice: Subject to any disclaimer, the term of this patent is extended or adjusted under 35 U.S.C. 154(b) by 22 days.

(21) Appl. No.: 12/910,177

(22) Filed: Oct. 22, 2010

(51) Int. Cl.
*H03B 1/00* (2006.01)
(52) U.S. Cl. ............. 327/108; 327/112; 326/85; 326/87
(58) Field of Classification Search ........................ None
See application file for complete search history.

(56) References Cited

U.S. PATENT DOCUMENTS

| | | | |
|---|---|---|---|
| 5,939,904 A * | 8/1999 | Fetterman et al. .............. 327/67 |
| 7,236,018 B1 * | 6/2007 | Wang et al. ................... 327/108 |
| 7,397,270 B1 * | 7/2008 | Luo et al. ......................... 326/32 |
| 7,417,460 B2 * | 8/2008 | De Laurentiis et al. ......... 326/82 |
| 7,443,211 B2 * | 10/2008 | Liu ................................. 327/108 |
| 7,598,779 B1 * | 10/2009 | Wang et al. .................... 327/108 |
| 2002/0190754 A1 * | 12/2002 | Brunolli .......................... 326/83 |
| 2005/0104623 A1 | 5/2005 | Guo et al. |

* cited by examiner

*Primary Examiner* — An Luu
(74) *Attorney, Agent, or Firm* — Steven J. Cahill

(57) ABSTRACT

A buffer circuit includes a current source circuit, first and second switch circuits that are coupled to the current source circuit, a first resistor coupled to the first switch circuit, a second resistor coupled to the second switch circuit, and a third switch circuit coupled to the first and the second resistors. The third switch circuit couples the first and the second resistors to a node at a first voltage when the buffer circuit is configured to function in a current mode logic buffer mode. The third switch circuit couples the first and the second resistors to a node at a second voltage when the buffer circuit is configured to function in an H-bridge buffer mode.

20 Claims, 8 Drawing Sheets

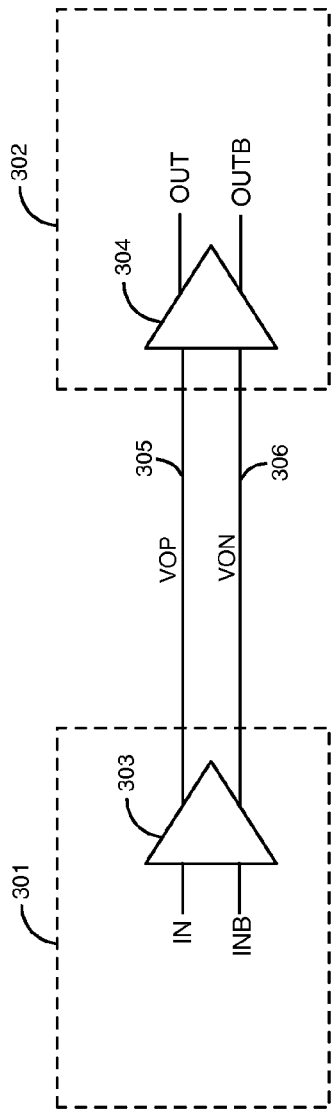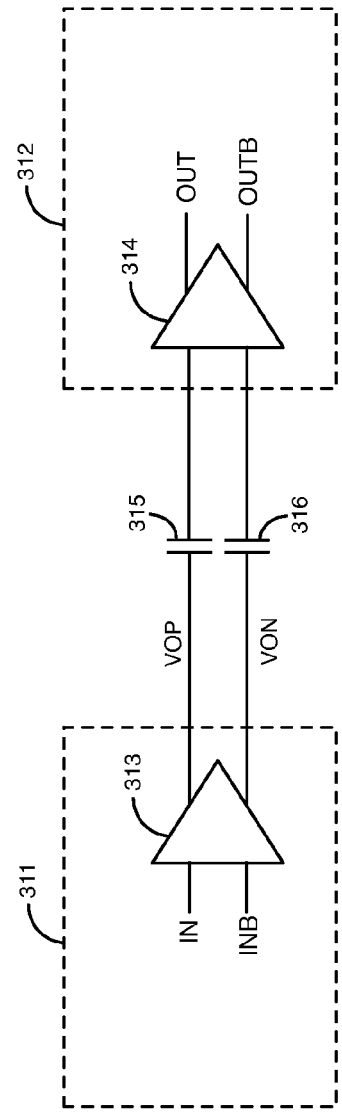
FIG. 3A
FIG. 3B

CONFIGURABLE BUFFER CIRCUITS AND METHODS

BACKGROUND

The present invention relates to electronic circuits, and more particularly, to configurable buffer circuits and methods.

FIG. 1 illustrates a prior art current mode logic (CML) buffer circuit 100 that is used in a transmitter circuit. CML buffer circuit 100 includes constant current source circuit 101, switch circuits 102-103, and resistors 104-105. CML buffer circuit 100 is coupled between a node at a supply voltage VCC and a node at a low voltage VSS (e.g., ground).

CML buffer circuit 100 buffers a differential input signal VIN to generate a differential output signal VOUT. The differential input signal VIN is based on input voltage signals IN and INB (i.e., VIN=IN−INB). The differential output signal VOUT is based on output voltage signals VOP and VON (i.e., VOUT=VOP−VON). The conductive states of switch circuits 102-103 are controlled by input voltage signals IN and INB, respectively. Input voltage signal INB is the logical inverse of input voltage signal IN. The voltage range for both of signals IN and INB is from voltage VSS to voltage VH, where VH is the voltage of the node between switch circuits 102 and 103. CML buffer circuit 100 generates output voltage signal VOP between switch circuit 102 and resistor 104. CML buffer circuit 100 generates output voltage signal VON between switch circuit 103 and resistor 105.

When input voltage signal IN is in a logic high state, switch circuit 102 is closed, input voltage signal INB is in a logic low state causing switch circuit 103 to be open, and the current I1 from current source circuit 101 flows through switch circuit 102. Differential output signal VOUT equals I1×R1, where R1 equals the resistance of each of resistors 104-105.

When input voltage signal IN is in a logic low state, switch circuit 102 is open, input voltage signal INB is in a logic high state causing switch circuit 103 to be closed, and the current I1 from current source circuit 101 flows through switch circuit 103. Differential output signal OUT equals −I1×R1.

The common mode voltage VCM of CML buffer circuit 100 equals (I1×R1)/2. The peak-to-peak differential voltage swing of the differential output signal VOUT equals 2×I1×R1.

FIG. 2 illustrates a prior art H-bridge buffer circuit 200 that is used in a transmitter circuit. H-bridge buffer circuit 200 includes constant current sources 201-202, switch circuits 203-206, and resistors 207-208. H-bridge buffer circuit 200 is coupled between a node at a supply voltage VCC and a node at a low voltage VSS.

H-bridge buffer circuit 200 buffers a differential input signal VIN to generate a differential output signal VOUT. The differential input signal VIN is based on input voltage signals IN and INB (i.e., VIN=IN−INB). The differential output signal VOUT is based on output voltage signals VOP and VON (i.e., VOUT=VOP−VON). The conductive states of switch circuits 203 and 206 are controlled by input voltage signal IN, and the conductive states of switch circuits 204-205 are controlled by input voltage signal INB. Input voltage signal INB is the logic inverse of input voltage signal IN. H-bridge buffer circuit 200 generates output voltage signal VOP between switch circuits 203-204. H-bridge buffer circuit 200 generates output voltage signal VON between switch circuits 205-206.

H-bridge buffer circuit 200 also includes a circuit such as an amplifier (not shown) that generates a constant voltage VCM between resistors 207-208. Voltage VCM equals the common mode voltage of output voltage signals VOP and VON.

When input voltage signal IN is in a logic high state, switch circuits 203 and 206 are closed, input voltage signal INB is in a logic low state causing switch circuits 204-205 to be open, and the current I2 from current source 201 flows through switch circuit 203, resistors 207-208, switch circuit 206, and current source 202. Differential output signal VOUT equals I2×2×R2, where R2 equals the resistance of each of resistors 207-208.

When input voltage signal IN is in a logic low state, switch circuits 203 and 206 are open, input voltage signal INB is in a logic high state causing switch circuits 204-205 to be closed, and the current I2 from current source 201 flows through switch circuit 205, resistors 208 and 207, switch circuit 204, and current source 202. Differential output signal VOUT equals −I2×2×R2.

H-bridge buffer circuit 200 generates a peak-to-peak differential voltage swing in VOUT that equals 4×I2×R2. If R1 equals R2, then H-bridge buffer circuit 200 draws half as much current as CML buffer circuit 100 to achieve the same output voltage swing in VOUT (i.e., I1=2×I2). As a result, H-bridge buffer circuit 200 consumes less power than CML buffer circuit 100.

However, H-bridge buffer circuit 200 generates a more limited range in the common mode voltage VCM of the differential output signal VOUT than CML buffer circuit 100. The common mode voltage VCM of the differential output signal VOUT of H-bridge buffer circuit 200 is limited based on the equation VCM≧(I2×R2)+VL+VSW2, where VL is the voltage of the node between switch circuits 204 and 206, and VSW2 is the voltage drop across switch circuit 204 or 206.

H-bridge buffer circuit 200 has less voltage headroom between supply voltage VCC and low voltage VSS compared to CML buffer circuit 100, because H-bridge buffer circuit 200 includes two current source circuits 201-202 that each consume a portion of the voltage drop between VCC and VSS. In addition, H-bridge buffer circuit 200 has a higher output capacitance than CML buffer circuit 100 at the nodes that generate output voltage signals VOP and VON. The higher output capacitance in H-bridge buffer circuit 200 slows down transitions in output voltage signals VOP and VON. H-bridge buffer circuit 200 generates more symmetrical waveforms in output voltage signals VOP and VON than CML buffer circuit 100.

BRIEF SUMMARY

According to some embodiments, a buffer circuit includes a current source circuit, first and second switch circuits that are coupled to the current source circuit, a first resistor coupled to the first switch circuit, a second resistor coupled to the second switch circuit, and a third switch circuit coupled to the first and the second resistors. The third switch circuit couples the first and the second resistors to a node at a first voltage when the buffer circuit is configured to function in a current mode logic buffer mode. The third switch circuit couples the first and the second resistors to a node at a second voltage when the buffer circuit is configured to function in an H-bridge buffer mode.

Various objects, features, and advantages of the present invention will become apparent upon consideration of the following detailed description and the accompanying drawings.

BRIEF DESCRIPTION OF THE DRAWINGS

FIG. 3A illustrates an example of a DC coupled transmission system that can include embodiments of the present invention.

FIG. 3B illustrates an example of an AC coupled transmission system that can include embodiments of the present invention.

DETAILED DESCRIPTION

Figure 1:
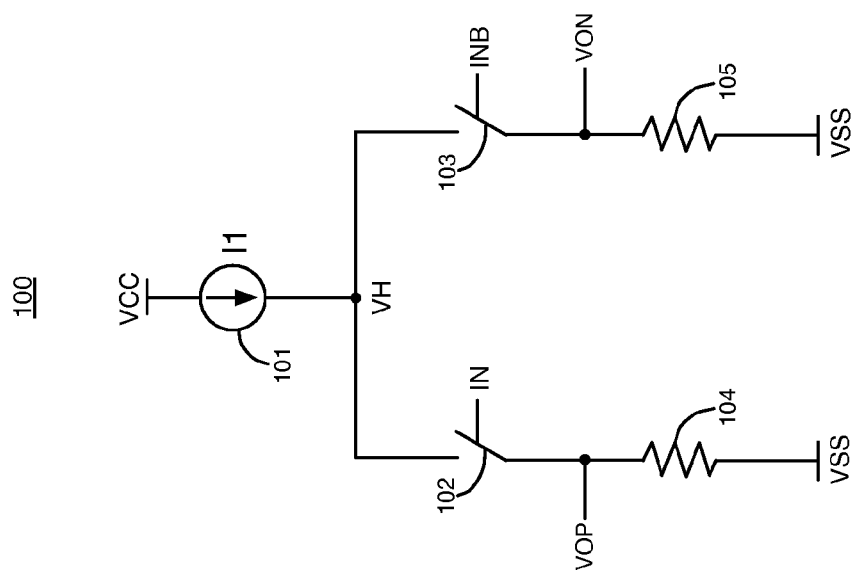
FIG. 1 illustrates a prior art current mode logic (CML) buffer circuit that is used in a transmitter circuit.
Figure 2:
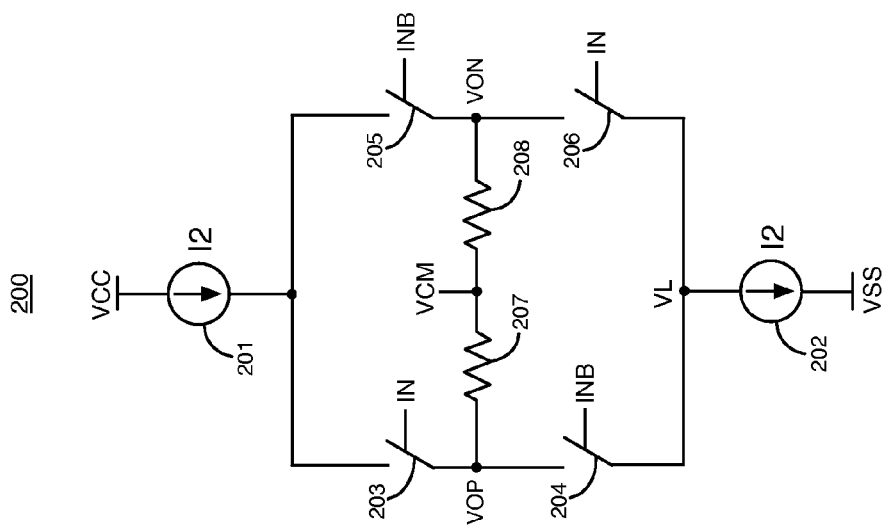
FIG. 2 illustrates a prior art H-bridge buffer circuit that is used in a transmitter circuit.

FIG. 3A illustrates an example of a direct current (DC) coupled transmission system. The transmission system of FIG. 3A includes two integrated circuits 301-302. Integrated circuit 301 includes a transmitter circuit 303. Integrated circuit 302 includes a receiver circuit 304. Transmitter circuit 303 generates output voltage signals VOP and VON based on input signals IN and INB. Output signals VOP and VON are transmitted from outputs of transmitter circuit 303 through transmission lines 305-306, respectively, to inputs of receiver circuit 304. Transmitter circuit 303 and receiver circuit 304 are DC coupled through transmission lines 305-306. Receiver circuit 304 generates output signals OUT and OUTB based on signals VOP and VON.

FIG. 3B illustrates an example of an alternating current (AC) coupled transmission system. The transmission system of FIG. 3B includes integrated circuits 311-312. Integrated circuit 311 includes transmitter circuit 313. Integrated circuit 312 includes receiver circuit 314. Transmitter circuit 313 generates output voltage signals VOP and VON based on input signals IN and INB. Output signals VOP and VON are transmitted from outputs of transmitter circuit 313 to inputs of receiver circuit 314 through transmission lines. The transmission lines are coupled to capacitors 315-316. The outputs of transmitter circuit 313 are AC coupled to the inputs of receiver circuit 314 through capacitors 315-316. Receiver circuit 314 generates output signals OUT and OUTB based on signals VOP and VON.

Figure 4:
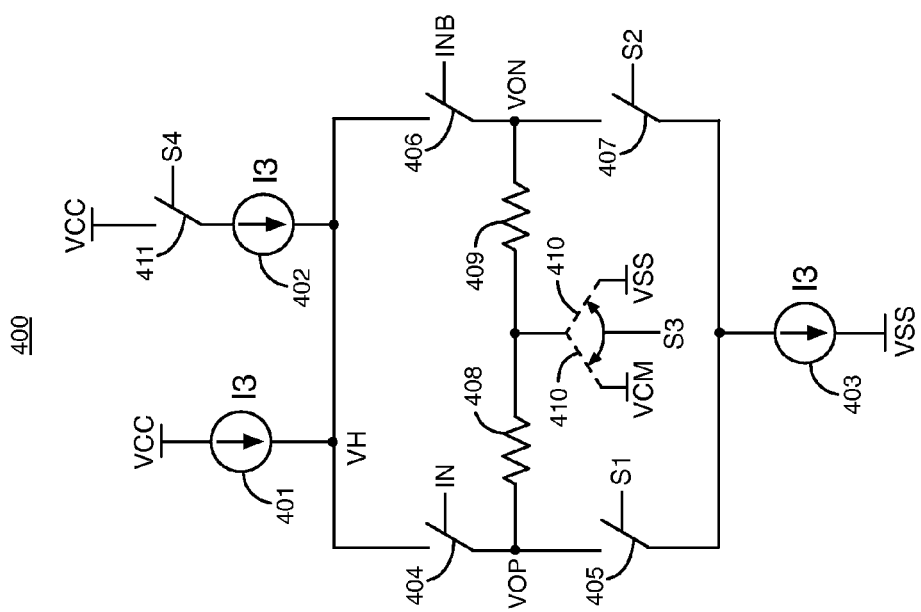
FIG. 4 illustrates an example of a configurable buffer circuit, according to an embodiment of the present invention.

FIG. 4 illustrates an example of a configurable buffer circuit 400, according to an embodiment of the present invention. Configurable buffer circuit 400 can be used in a transmitter circuit. As an example, configurable buffer circuit 400 can be used in transmitter circuit 303 in the DC coupled transmission system of FIG. 3A. As another example, configurable buffer circuit 400 can be used in transmitter circuit 313 in the AC coupled transmission system of FIG. 3B. Configurable buffer circuit 400 is coupled between a node at a supply voltage VCC and a node at a ground voltage VSS. As an example that is not intended to be limiting, supply voltage VCC may have a fixed voltage that is in a range between 1.2-1.5 volts and ground voltage VSS may be at 0 volts.

Configurable buffer circuit 400 buffers a differential input voltage signal VIN to generate a differential output voltage signal VOUT. The differential input voltage signal VIN is based on two digital input voltage signals IN and INB. Input voltage signal INB is driven to equal the logical inverse of input voltage signal IN by an inverter (not shown). The voltage swing of IN and INB is limited between the ground voltage VSS and voltage VH, where voltage VH is the voltage of the node between switch circuits 404 and 406. The differential input voltage signal VIN=IN−INB. The differential output voltage signal VOUT is based on two output voltage signals VOP and VON. The differential output voltage signal VOUT=VOP−VON.

Configurable buffer circuit 400 includes current source circuits 401-403, switch circuits 404-407 and 410-411, and resistors 408-409. Configurable buffer circuit 400 generates output voltage signal VOP between switch circuits 404-405. Configurable buffer circuit 400 generates output voltage signal VON between switch circuits 406-407. The conductive states of switch circuits 404 and 406 are controlled by digital input voltage signals IN and INB, respectively. The conductive states of switch circuits 405, 407, 410, and 411 are controlled by control signals S1, S2, S3, and S4, respectively. Each of switch circuits 404-407 and 411 can be implemented, for example, by one or multiple field-effect transistors (FETs). Switch circuit 410 can be implemented, for example, by multiple FETs. The currents generated by current source circuits 401-403 can be programmable.

Figure 5C:
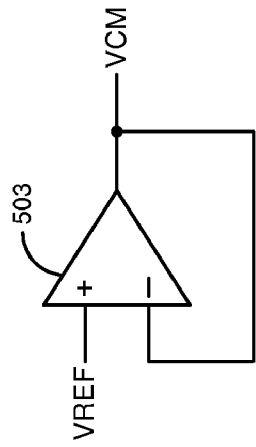
FIG. 5C illustrates an example of an amplifier circuit that generates the common mode voltage VCM of differential output voltage signal VOUT at its output.
Figure 5B:
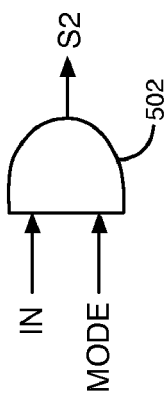
FIGS. 5A-5B illustrate examples of logic circuits that generate control signals shown in FIG. 4, according to embodiments of the present invention.
Figure 5A:
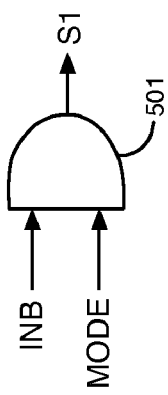

FIGS. 5A-5B illustrate examples of logic circuits that generate control signals S1-S2, respectively, according to embodiments of the present invention. FIG. 5A shows an AND logic gate circuit 501. AND logic gate circuit 501 receives input voltage signal INB at a first input and a digital MODE signal at a second input. AND logic gate circuit 501 performs an AND Boolean logic function on signals INB and MODE to generate the logic state of control signal S1. FIG. 5B shows an AND logic gate circuit 502. AND logic gate circuit 502 receives input voltage signal IN at a first input and the MODE signal at a second input. AND logic gate circuit 502 performs an AND Boolean logic function on signals IN and MODE to generate control signal S2. According to other embodiments, AND logic gate circuits 501-502 are replaced with other types of logic gate circuits that generate signals S1-S2.

Referring again to FIG. 4, configurable buffer circuit 400 is configurable to operate either in an H-bridge buffer mode or in a current mode logic (CML) buffer mode. The MODE signal controls whether configurable buffer circuit 400 is configured to operate in the H-bridge buffer mode or in the CML buffer mode.

The MODE signal is driven to a logic high state to cause configurable buffer circuit 400 to function as an H-bridge buffer circuit in the H-bridge buffer mode. When the MODE signal is in a logic high state, AND gate circuits 501 and 502 cause control signals S1 and S2 to have the same logic states as input voltage signals INB and IN, respectively. In H-bridge buffer mode, switch circuit 405 has the same conductive state as switch circuit 406, and switch circuit 407 has the same conductive state as switch circuit 404.

When the MODE signal is in a logic high state, control signal S4 is driven to a logic state that causes switch circuit 411 to be open. When switch circuit 411 is open, current source circuit 402 is decoupled from the node at supply voltage VCC, and no current flows from current source circuit 402 through configurable buffer circuit 400. Also, when the MODE signal is in a logic high state, control signal S3 is driven to a logic state that causes switch circuit 410 to couple resistors 408-409 to a node at a common mode voltage VCM of the differential output voltage signal VOUT and to decouple resistors 408-409 from a node at VSS. Switch circuit 410 can, for example, be implemented by a first FET coupled between resistors 408-409 and the node at VCM, and a second FET coupled between resistors 408-409 and the node at VSS.

FIG. 5C illustrates an example of an amplifier circuit 503 that generates the common mode voltage VCM of differential output voltage signal VOUT at its output. Amplifier circuit 503 receives a reference voltage VREF at its non-inverting input. Reference voltage VREF equals an expected common mode voltage of differential output voltage signal VOUT. The output of amplifier circuit 503 is coupled to the inverting input of amplifier circuit 503. Amplifier circuit 503 drives the voltage difference between VREF and VCM to zero or near zero. Amplifier circuit 503 can, for example, include a source-follower transistor.

When input voltage signal IN is in a logic high state in H-bridge buffer mode, switch circuits 404 and 407 are closed, input voltage signal INB is in a logic low state causing switch circuits 405-406 to be open, and the current I3 from current source 401 flows through switch circuit 404, resistors 408-409, switch circuit 407, and current source circuit 403 to VSS. When input voltage signal IN is in the logic high state, differential output signal VOUT equals I3×2×R3, where R3 equals the resistance of each of resistors 408-409.

When input voltage signal IN is in a logic low state in H-bridge buffer mode, switch circuits 404 and 407 are open, input voltage signal INB is in a logic high state causing switch circuits 405-406 to be closed, and the current I3 from current source 401 flows through switch circuit 406, resistors 409 and 408, switch circuit 405, and current source circuit 403 to VSS. When input voltage signal IN is in a logic low state, differential output signal VOUT equals –I3×2×R3.

The MODE signal is driven to a logic low state to cause configurable buffer circuit 400 to function as a pseudo-CML buffer circuit in the CML buffer mode. When the MODE signal is in a logic low state, AND gates 501-502 drive control signals S1-S2 to logic low states that cause switch circuits 405 and 407 to be open in the CML buffer mode, respectively, regardless of the logic states of input signals IN and INB.

When the MODE signal is in a logic low state, control signal S4 is driven to a logic state that causes switch circuit 411 to be closed. When switch circuit 411 is closed, current source circuit 402 is coupled to the node at supply voltage VCC, and a current I3 from current source circuit 402 flows through one of switch circuits 404 or 406. In CML buffer mode, each of the 2 current source circuits 401-402 generates the same current, and the current through each of current source circuits 401-402 equals I3. In the CML buffer mode, current source circuit 403 is in a floating state, and no current flows through current source circuit 403. Also, when the MODE signal is in a logic low state, control signal S3 is driven to a logic state that causes switch circuit 410 to couple resistors 408-409 to the node at voltage VSS and to decouple resistors 408-409 from the node at voltage VCM.

Figure 6:
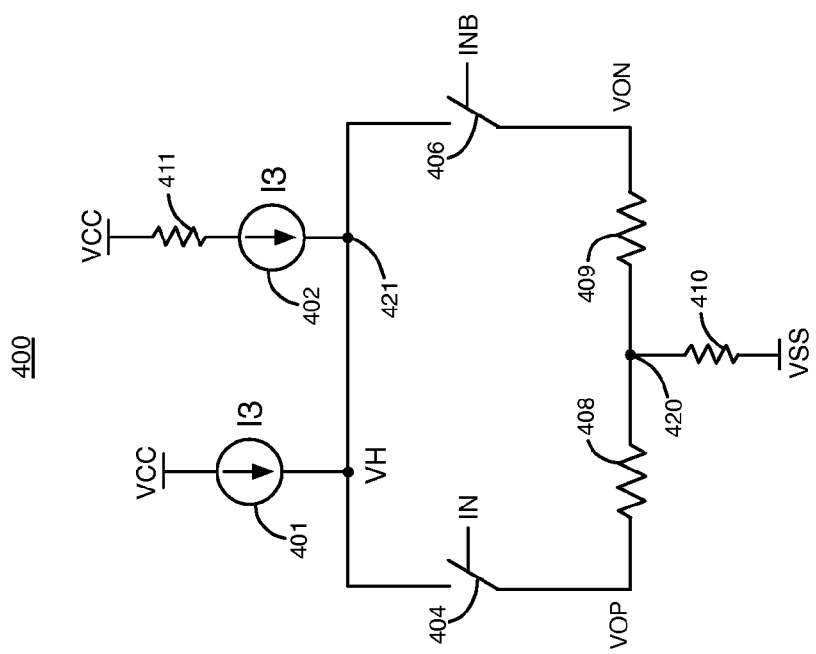
FIG. 6 illustrates the configurable buffer circuit of FIG. 4 when it is configured as a pseudo-CML buffer circuit in CML buffer mode.

FIG. 6 illustrates configurable buffer circuit 400 when it is configured as a pseudo-CML buffer circuit in CML buffer mode. As shown in FIG. 6, switch circuits 410-411 function as resistors in the CML buffer mode when switch circuit 411 is closed and switch circuit 410 is coupled to the node at voltage VSS. The field-effect transistors used to implement switch circuits 410-411 have relatively large width-to-length channel ratios so that switch circuits 410-411 have low drain-to-source resistances and small voltage drops. The small voltage drop across switch circuit 410 in the CML buffer mode causes node 420 to be at a voltage that is greater than voltage VSS. The resistance of switch circuit 410 has no impact on the differential output return loss of configurable buffer circuit 400. However, the resistance of switch circuit 410 may cause a small increase in the common mode output return loss of configurable buffer circuit 400.

In CML buffer mode, a current equal to 2×I3 flows through configurable buffer circuit 400 from the node at VCC to the node at VSS. The current 2×I3 that flows through configurable buffer circuit 400 in CML buffer mode is two times the current I3 that flows through configurable buffer circuit 400 in H-bridge buffer mode. Doubling the current through configurable buffer circuit 400 in CML buffer mode compared to H-bridge buffer mode causes the output voltage swing VOD of differential output voltage signal VOUT to be the same in both the CML buffer mode and in the H-bridge buffer mode. The peak-to-peak differential voltage swing VOD of the differential output signal VOUT in CML buffer mode equals 4×I3×R3, where R3 equals the resistance of each of resistors 408-409.

When input voltage signal IN is in a logic high state in CML buffer mode, switch circuit 404 is closed, input voltage signal INB is in a logic low state causing switch circuit 406 to be open, and the current 2×I3 generated by current source circuits 401-402 flows through switch circuit 404, resistor 408, and switch circuit 410 to VSS. Differential output signal VOUT equals 2×I3×R3, where VSS equals zero volts, and VOUT=VOP−VON.

When input voltage signal IN is in a logic low state in CML buffer mode, switch circuit 404 is open, input voltage signal INB is in a logic high state causing switch circuit 406 to be closed, and the current 2×I3 generated by current source circuits 401-402 flows through switch circuit 406, resistor 409, and switch circuit 410 to VSS. Differential output signal VOUT equals −2×I3×R3, where VSS equals zero volts.

In an embodiment of configurable buffer circuit 400, each of the switch circuits 404 and 406 is implemented by a single p-channel metal oxide semiconductor field-effect transistor (MOSFET), and each of the switch circuits 405 and 407 is implemented by a single n-channel MOSFET. In this embodiment, the gate voltages of the p-channel MOSFETs in switch circuits 404 and 406 are not pulled above voltage VH at node 421 (shown in FIG. 6) to open the respective switch circuit 404 or 406, so that the opened switch circuit 404 or 406 can be closed quickly. However, each of the switch circuits 404 and 406 may generate some leakage current when the respective switch circuit 404 or 406 is open. This leakage current may increase the output return loss of configurable buffer circuit 400. Also, the MOSFET in each of switch circuits 404 and 406 is preferably maintained in saturation when the respective switch circuit 404 or 406 is closed in CML buffer mode.

Configurable buffer circuit 400 is configurable to operate in CML buffer mode or in H-bridge buffer mode. Configurable buffer circuit 400 can support protocols that require the transmitter circuit to be connected to the receiver circuit via DC coupled or AC coupled transmission lines as shown in FIGS. 3A-3B. As an example, configurable buffer circuit 400 can be configured in CML buffer mode in a transmitter circuit to support the QuickPath Interconnect (QPI) protocol. Configurable buffer circuit 400 requires substantially less die area and has less output parasitic loading than a transmitter circuit that has an H-bridge buffer circuit and a separate CML buffer circuit that are coupled to the same output pads, but one of the H-bridge buffer circuit or CML buffer circuit is disabled.

Figure 7:
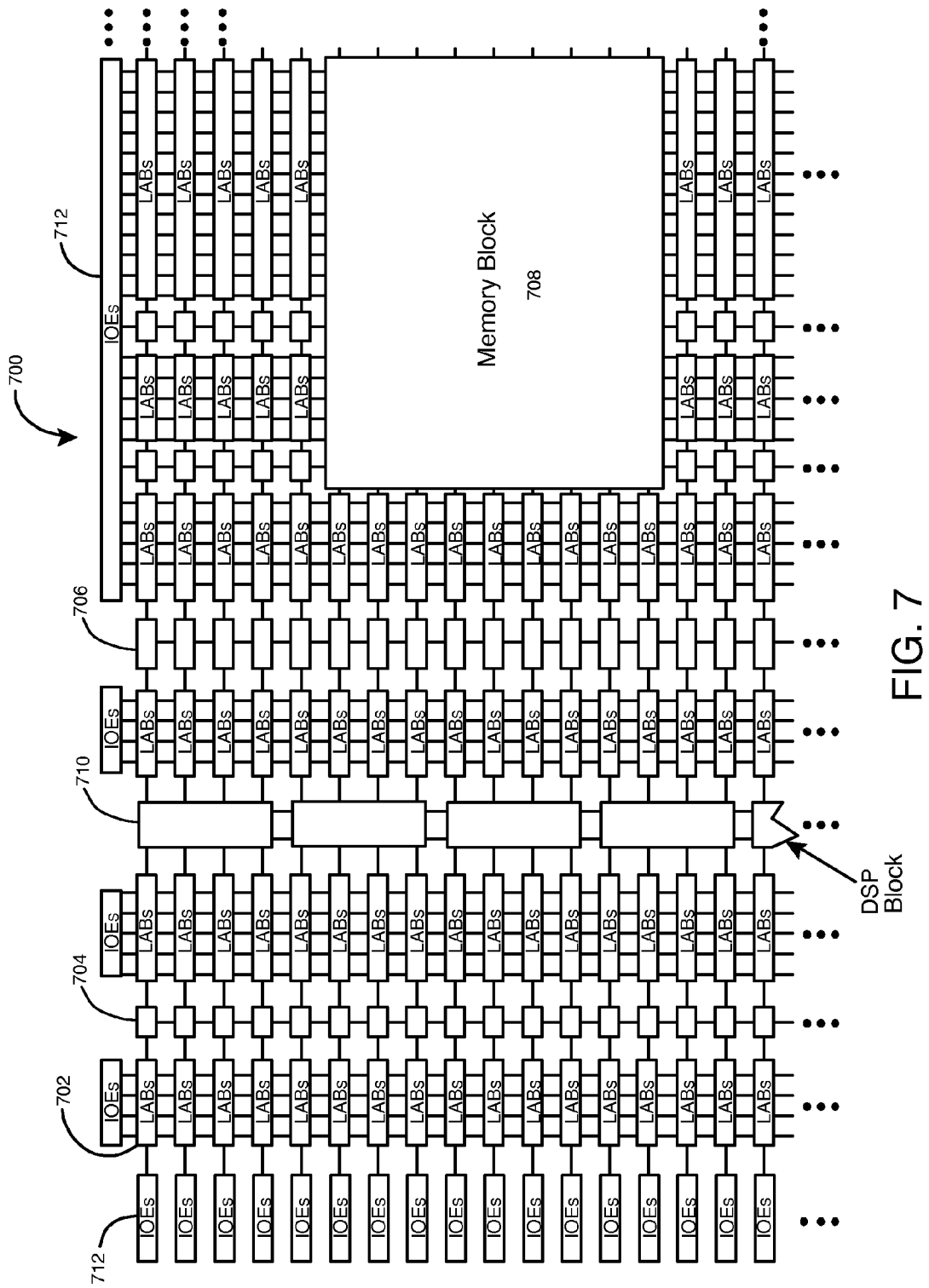
FIG. 7 is a simplified partial block diagram of a field programmable gate array (FPGA) that can include aspects of the present invention.

FIG. 7 is a simplified partial block diagram of a field programmable gate array (FPGA) 700 that can include aspects of the present invention. FPGA 700 is merely one example of an integrated circuit that can include features of the present invention. It should be understood that embodiments of the present invention can be used in numerous types of integrated circuits such as field programmable gate arrays (FPGAs), programmable logic devices (PLDs), complex programmable logic devices (CPLDs), programmable logic arrays (PLAs), application specific integrated circuits (ASICs), memory integrated circuits, central processing units, microprocessors, analog integrated circuits, etc.

FPGA 700 includes a two-dimensional array of programmable logic array blocks (or LABs) 702 that are interconnected by a network of column and row interconnect conductors of varying length and speed. LABs 702 include multiple (e.g., 10) logic elements (or LEs).

An LE is a programmable logic circuit block that provides for efficient implementation of user defined logic functions. An FPGA has numerous logic elements that can be configured to implement various combinatorial and sequential functions. The logic elements have access to a programmable interconnect structure. The programmable interconnect structure can be programmed to interconnect the logic elements in almost any desired configuration.

FPGA 700 also includes a distributed memory structure including random access memory (RAM) blocks of varying sizes provided throughout the array. The RAM blocks include, for example, blocks 704, blocks 706, and block 708. These memory blocks can also include shift registers and first-in-first-out (FIFO) buffers.

FPGA 700 further includes digital signal processing (DSP) blocks 710 that can implement, for example, multipliers with add or subtract features. Input/output elements (IOEs) 712 located, in this example, around the periphery of the chip, support numerous single-ended and differential input/output standards. IOEs 712 include input and output buffers that are coupled to pads of the integrated circuit. The output buffers may include configurable buffer circuit 400 shown in FIG. 4. The pads are external terminals of the FPGA die that can be used to route, for example, input signals, output signals, and supply voltages between the FPGA and one or more external devices. It should be understood that FPGA 700 is described herein for illustrative purposes only and that the present invention can be implemented in many different types of integrated circuits.

Figure 8:
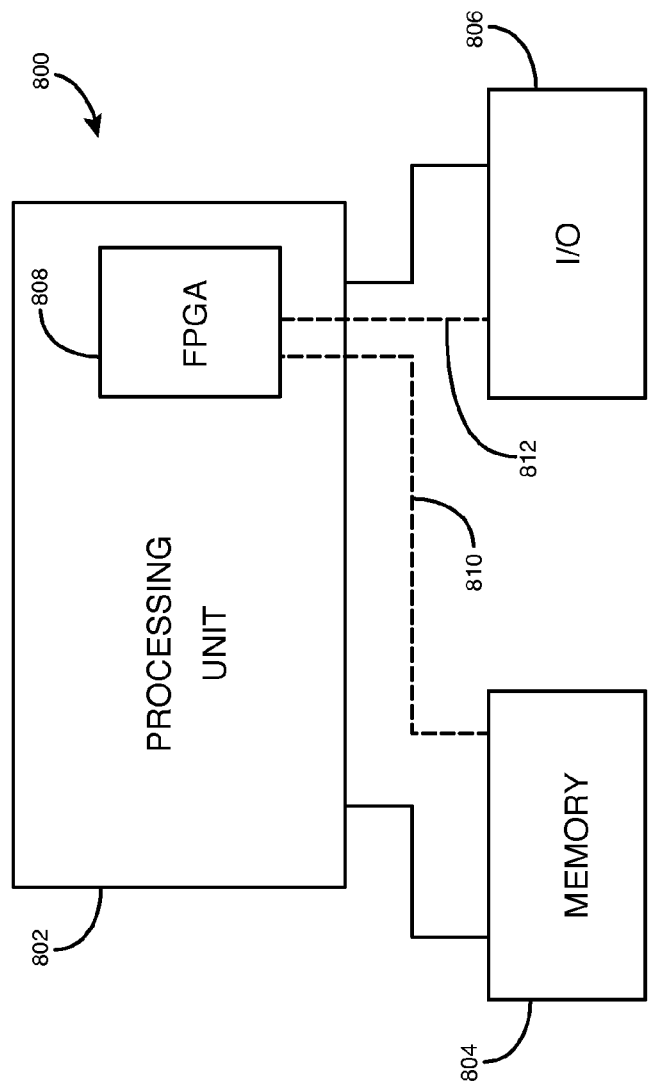
FIG. 8 shows a block diagram of an exemplary digital system that can embody techniques of the present invention.

The present invention can also be implemented in a system that has an FPGA as one of several components. FIG. 8 shows a block diagram of an exemplary digital system 800 that can embody techniques of the present invention. System 800 can be a programmed digital computer system, digital signal processing system, specialized digital switching network, or other processing system. Moreover, such systems can be designed for a wide variety of applications such as telecommunications systems, automotive systems, control systems, consumer electronics, personal computers, Internet communications and networking, and others. Further, system 800 can be provided on a single board, on multiple boards, or within multiple enclosures.

System 800 includes a processing unit 802, a memory unit 804, and an input/output (I/O) unit 806 interconnected together by one or more buses. According to this exemplary embodiment, an FPGA 808 is embedded in processing unit 802. FPGA 808 can serve many different purposes within the system of FIG. 8. FPGA 808 can, for example, be a logical building block of processing unit 802, supporting its internal and external operations. FPGA 808 is programmed to implement the logical functions necessary to carry on its particular role in system operation. FPGA 808 can be specially coupled to memory 804 through connection 810 and to I/O unit 806 through connection 812.

Processing unit 802 can direct data to an appropriate system component for processing or storage, execute a program stored in memory 804, receive and transmit data via I/O unit 806, or other similar functions. Processing unit 802 can be a central processing unit (CPU), microprocessor, floating point coprocessor, graphics coprocessor, hardware controller, microcontroller, field programmable gate array programmed for use as a controller, network controller, or any type of processor or controller. Furthermore, in many embodiments, there is often no need for a CPU.

For example, instead of a CPU, one or more FPGAs 808 can control the logical operations of the system. As another example, FPGA 808 acts as a reconfigurable processor that can be reprogrammed as needed to handle a particular computing task. Alternatively, FPGA 808 can itself include an embedded microprocessor. Memory unit 804 can be a random access memory (RAM), read only memory (ROM), fixed or flexible disk media, flash memory, tape, or any other storage means, or any combination of these storage means.

The foregoing description of the exemplary embodiments of the present invention has been presented for the purposes of illustration and description. The foregoing description is not intended to be exhaustive or to limit the present invention to the examples disclosed herein. In some instances, features of the present invention can be employed without a corresponding use of other features as set forth. Many modifications, substitutions, and variations are possible in light of the above teachings, without departing from the scope of the present invention.

What is claimed is:

1. A buffer circuit comprising:
a first current source circuit;
first and second switch circuits that are coupled to the first current source circuit;
a first resistor coupled to the first switch circuit;
a second resistor coupled to the second switch circuit; and
a third switch circuit coupled to the first and the second resistors, wherein the third switch circuit couples the first and the second resistors to a node at a first voltage when the buffer circuit is configured to function in a current mode logic buffer mode, and wherein the third switch circuit couples the first and the second resistors to a node at a second voltage when the buffer circuit is configured to function in an H-bridge buffer mode.

2. The buffer circuit of claim 1 further comprising:
a fourth switch circuit coupled to the first switch circuit;
a fifth switch circuit coupled to the fourth and the second switch circuits; and
a second current source circuit having a first terminal coupled to the fourth and the fifth switch circuits and a second terminal coupled to a node at the first voltage.

3. The buffer circuit of claim 2 further comprising:
a third current source circuit coupled to the first and the second switch circuits; and
a sixth switch circuit coupled between a node at a supply voltage and the third current source circuit, wherein the sixth switch circuit couples the third current source circuit to the node at the supply voltage when the buffer circuit is configured to function in the current mode logic buffer mode, and wherein the sixth switch circuit decouples the third current source circuit from the node at the supply voltage when the buffer circuit is configured to function in the H-bridge buffer mode.

4. The buffer circuit of claim 2 wherein a conductive state of the first switch circuit is controlled based on a first input signal, and a conductive state of the second switch circuit is controlled based on a second input signal that is a logical inverse of the first input signal.

5. The buffer circuit of claim 4 wherein the fourth and the fifth switch circuits are open when the buffer circuit is configured to function in the current mode logic buffer mode.

6. The buffer circuit of claim 5 wherein a conductive state of the fourth switch circuit is controlled based on the second input signal and a conductive state of the fifth switch circuit is controlled based on the first input signal when the buffer circuit is configured to function in the H-bridge buffer mode.

7. The buffer circuit of claim 1 further comprising:
an amplifier that generates the second voltage as a common mode voltage of a differential output voltage signal of the buffer circuit, wherein the differential output voltage signal is based on a first output voltage generated between the first switch circuit and the first resistor and a second output voltage generated between the second switch circuit and the second resistor.

8. The buffer circuit of claim 1 wherein the buffer circuit is in a programmable logic integrated circuit.

9. The buffer circuit of claim 1 wherein the buffer circuit is in a transmitter circuit, and the transmitter circuit is in an integrated circuit.

10. A buffer circuit comprising:
a first current source circuit;
a first switch circuit coupled to the first current source circuit;
a second switch circuit coupled to the first switch circuit;
a third switch circuit coupled to the first switch circuit;
a fourth switch circuit coupled to the second and the third switch circuits;
a first resistor coupled to the first and the third switch circuits;
a second resistor coupled to the first resistor and to the second and the fourth switch circuits;
a fifth switch circuit coupled to the first resistor, the second resistor, a node at a first voltage, and a node at a second voltage; and
a second current source circuit coupled to the third and the fourth switch circuits.

11. The buffer circuit of claim 10 wherein the first switch circuit is controlled based on a first input signal, wherein the second switch circuit is controlled based on a second input signal that is a logical inverse of the first input signal, wherein the third and the fourth switch circuits remain open when the buffer circuit is configured to function in a current mode logic buffer mode, and wherein the fourth and the third switch circuits are controlled based on the first and the second input signals, respectively, when the buffer circuit is configured to function in an H-bridge buffer mode.

12. The buffer circuit of claim 11 wherein the fifth switch circuit couples the first and the second resistors to the node at the first voltage when the buffer circuit is configured to function in the current mode logic buffer mode, and wherein the fifth switch circuit couples the first and the second resistors to the node at the second voltage when the buffer circuit is configured to function in the H-bridge buffer mode.

13. The buffer circuit of claim 10 further comprising:
an amplifier that generates the second voltage as a common mode voltage of a differential output voltage signal of the buffer circuit, wherein the differential output voltage signal is based on a first output voltage generated between the first switch circuit and the first resistor and a second output voltage generated between the second switch circuit and the second resistor.

14. The buffer circuit of claim 10 wherein the second current source circuit is coupled to a node at the first voltage.

15. The buffer circuit of claim 10 further comprising:
a third current source circuit coupled to the first and the second switch circuits; and
a sixth switch circuit coupled between a node at a supply voltage and the third current source circuit, wherein the sixth switch circuit couples the third current source circuit to the node at the supply voltage when the buffer circuit is configured to function in a current mode logic buffer mode, and wherein the sixth switch circuit decouples the third current source circuit from the node at the supply voltage when the buffer circuit is configured to function in an H-bridge buffer mode.

16. A method for buffering a signal, the method comprising:
providing current from a first current source through a first switch circuit, a first resistor, and a second switch circuit based on a first input signal provided to the first switch circuit during a current mode logic buffer mode;
providing the current from the first current source through a third switch circuit, a second resistor, and the second switch circuit based on a second input signal provided to the third switch circuit during the current mode logic buffer mode;
providing the current from the first current source through the first switch circuit, the first resistor, the second resistor, a fourth switch circuit, and a second current source based on the first input signal during an H-bridge buffer mode; and
providing the current from the first current source through the third switch circuit, the first resistor, the second resistor, a fifth switch circuit, and the second current source based on the second input signal during the H-bridge buffer mode.

17. The method of claim 16 further comprising:
coupling the second switch circuit to a node at a first voltage during the current mode logic buffer mode; and
coupling the second switch circuit to a node at a second voltage during the H-bridge buffer mode.

18. The method of claim 16 further comprising:
coupling a third current source to a node at a supply voltage through a sixth switch circuit during the current mode logic buffer mode; and
decoupling the third current source from the node at the supply voltage through the sixth switch circuit during the H-bridge buffer mode.

19. The method of claim 16 further comprising:
preventing the fourth and the fifth switch circuits from conducting the current from the first current source during the current mode logic buffer mode in response to a control signal.

20. The method of claim 17 further comprising:
causing the second voltage to be equal to a common mode voltage of a differential output signal, wherein the differential output signal is based on a first output voltage generated between the first switch circuit and the first resistor and a second output voltage generated between the third switch circuit and the second resistor.

* * * * *